CONTROLLED VARIABLE
CONTROL ACTION – "LOW START"

CONTROLLED VARIABLE
CONTROL ACTION – "HIGH START"

CONTROLLED VARIABLE
CONTROL ACTION – OVERSHOOT
AND RETURN

CONTROLLED VARIABLE
CONTROL ACTION – SPURIOUS
SURGE CAUSING ERRONEOUS
CONTROL ACTION AND RETURN TO
NORMAL

INVENTOR.
JAMES R. HACKMAN
BY Harry J. McCauley
ATTORNEY

INVENTOR.
JAMES R. HACKMAN 3,190,301
INTERMITTENT OPTIMAL CONTROLLER
James R. Hackman, Concordville, Pa., assignor to E. I.
du Pont de Nemours and Company, Wilmington, Del.,
a corporation of Delaware
Filed June 14, 1961, Ser. No. 117,151
4 Claims. (Cl. 137—92)

This invention relates to process controllers, and particularly to an intermittent optimal process controller of electro-pneumatic type.

Many chemical process display maxima, minima or other distinctive criticalities of a process parameter (hereinafter called "the process variable"), or, in generic terms, an "optimum," subject to convenient measurement, which affords a basis for control by regulating a variable effective in the process (hereinafter called the "controlled variable"), so as to adhere to the region of the optimum as closely as practicable, for which reason such control is termed "optimal." Attempts have been made to develop optimal controllers; however, these have been of relatively complex electronic or mechanical designs which have not been very satisfactory from the standpoint of first cost, maintenance and reliability. There has been developed a continuous pneumatic optimal controller, which is described in U.S. application S.N. 117,152, now Patent No. 3,152,602, filed on the same date herewith, and the invention of this application constitutes an intermittent-type controller of electro-pneumatic type.

Figure 1A:
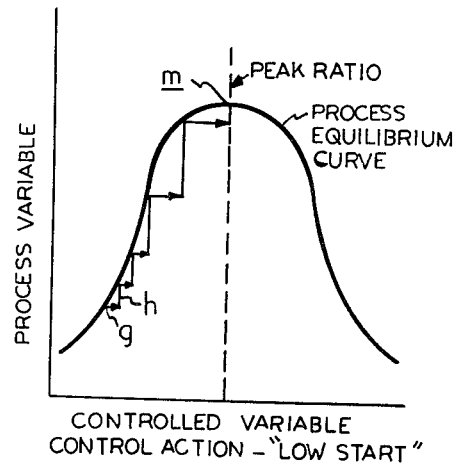
Figure 1B:
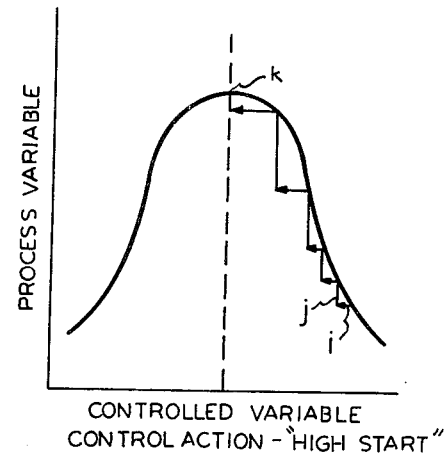
Figure 1C:
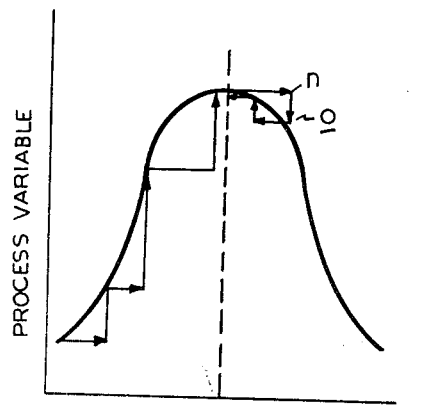
Figure 1D:
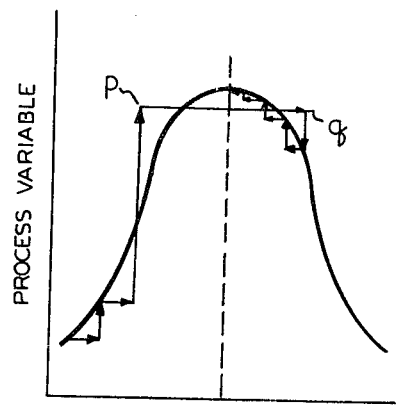
Figure 2:
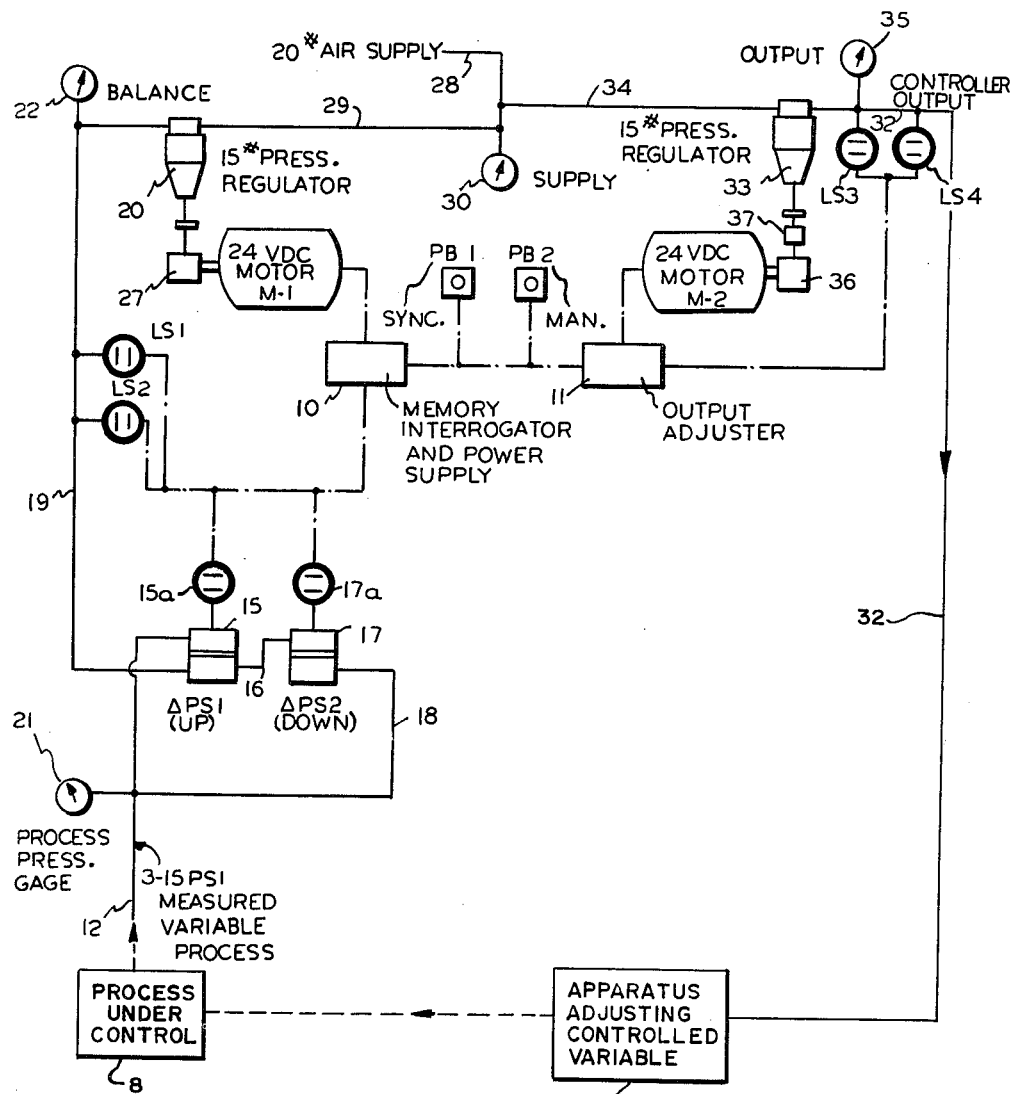
Figure 3:
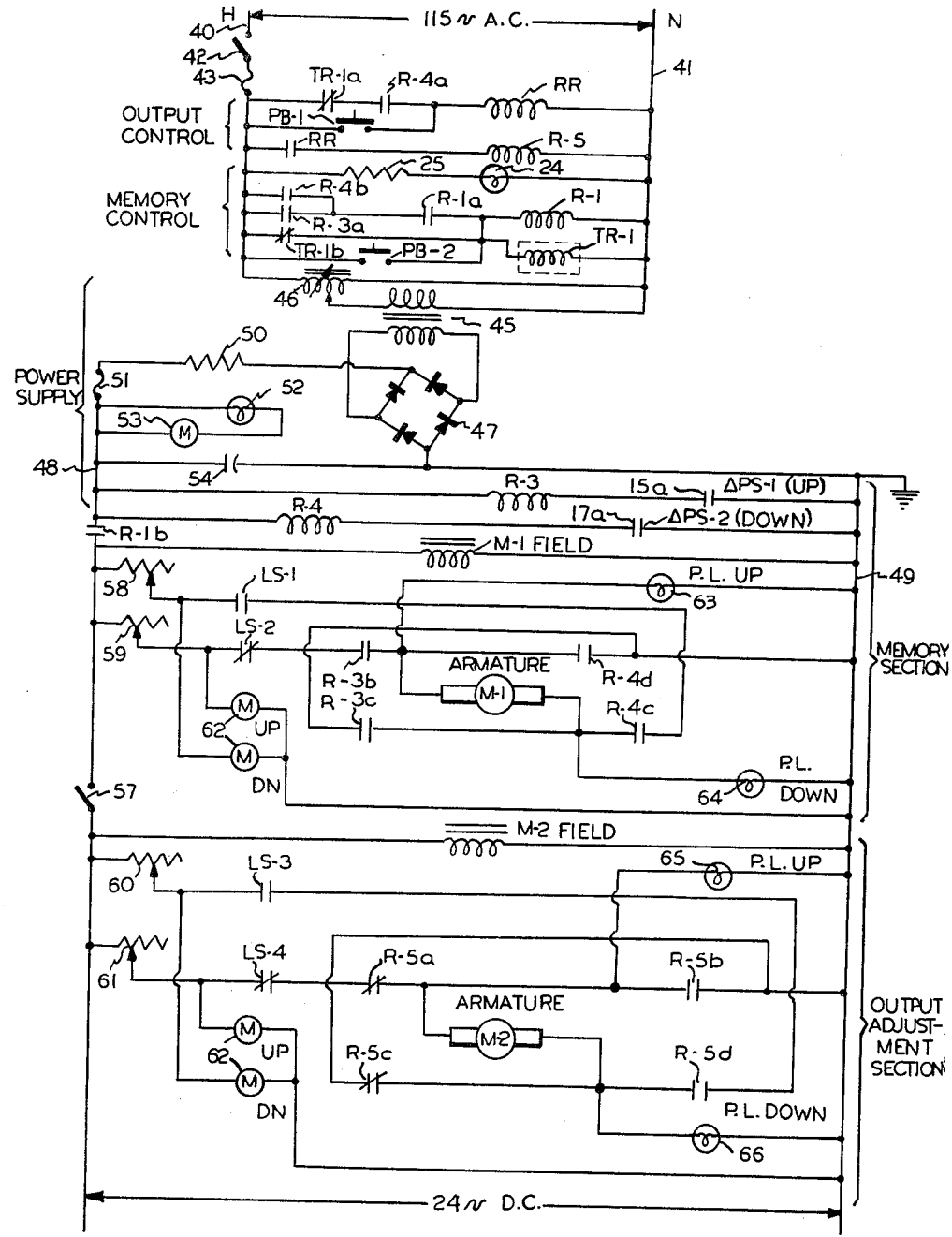

An object of this invention is to provide an improved intermittent-type optimal controller. Other objects of this invention are to provide an intermittent-type electro-pneumatic optimal controller, an optimal controller of improved reliability and one lower in first cost and maintenance than those known to the art. The manner in which these and other objects of this invention are attained will become apparent from the following detailed description, and the drawings, in which:

FIGS. 1a–1d are diagrammatic representations of four separate control sequences for the invention of this application, FIG. 2 is a schematic representation of a preferred embodiment of apparatus according to this invention wherein pneumatic lines and mechanical connections are shown in solid line representation, whereas the functional electrical connection is shown in broken line representation, and FIG. 3 is a schematic electrical circuit for the apparatus of FIG. 2.

Generally, this invention consists of an intermittent optimal process controller comprising in combination pneumatic memory means sampling and retaining a measure of the magnitude of the process variable upon which control is to be based at successive regular time intervals permitting a substantial process variable correction as a consequence of the immediately preceding controlled variable adjustment, pneumatic means sensing the process variable and generating a signal proportionate in magnitude to, and in accordance with the direction of change of, the process variable over the measure retained in the pneumatic memory means, and means responsive to the signal of the pneumatic means sensing the process variable altering the controlled variable in a direction bringing the process variable towards the optimum upon which control is to be based and in an amount proportional to the amount the process variable changed since the immediately preceding sampling.

An example of a process displaying an optimum in operation, which is a maxima in this instance, although operation can just as well be based on a minima, or other criticality as hereinafter described, is a polymerization wherein the viscosity of the mixture varies as a function of the proportion of a supply stream of one indgredient with respect to fixed supplies of other ingredients introduced to the process. Thus, as shown in FIGS. 1a–1d, a process equilibrium curve can be drawn wherein the process variable, in this case viscosity, is plotted on the ordinate scale against the controlled variable, i.e., ratio of rate of supply of a responsible ingredient to the fixed rates of supply of the remaining ingredients, on the abscissa.

The action of the controller of this invention is as a series of steps, each regulative of the controlled variable, responsive to individual samplings, deriving a signal which constitutes a measurement of the process variable informative of both direction and change in magnitude in consequence of the immediately preceding step. The control imposed is always in a direction counter to downward progression of the process variable, but the step size with which the optimum is approached is proportional to the distance which the process has moved, as evidenced by the sensed change in the process variable occurring since the immediately preceding sampling, so that a close approach to the optimum is achieved as hereinafter described with respect to the detailed operation.

Referring to FIG. 2, it is convenient to consider the apparatus of this invention as made up of two subassemblies which can be denoted, in terms of their general functions: (1) the memory and interrogator section and (2) the output adjuster section, as indicated by the legends printed in their respective electrical circuit blocks 10 and 11.

The process variable (viscosity) is sensed continuously as a 3–15 p.s.i.g. air pressure signal derived from a conventional transducer through line 12 emanating from the process under control, indicated schematically at block 8, by a pair of sensitive, reverse-connected, differential pressure switches 15 and 17. Switches 15 and 17 are commercially available slack diaphragm types, the contacts of which are denoted 15a and 17a, respectively, which have a sensitivity of, typically, about 0.01" $H_2O$. The reverse connection referred to consists in the connection of lines 12 to one side of one of the differential pressure switches (in this instance 15) and to the opposite side of the other pressure switch, i.e., switch 17, via branch line 18, and then connecting the remaining sides of the two switches in open communication via line 16, thereby obtaining a pressure balance action as hereinafter described. The memory reference of the pressure switch pair is obtained by connecting reset air pressure line 19 running from the output of pressure regulator 20 into open communication with line 16, conveniently through the body of switch 15. A pressure gage 21 is provided in communication with line 12 to give indication of the existing transducer pressure and a similar pressure gage 22 is provided in communication with line 19 to indicate the balance pressure. Preferably, gages 21 and 22 are combined into a single duplex gage (not detailed) having a pair of pointers, each reserved to one of the two individual pressures, so as to facilitate determination of what direction the variance therebetween takes, as well as the differential magnitude.

The memory-interrogator section is further provided with a reversible control motor M–1, which is typically a 24 v. D.-C. type, direct-connected to a gear speed reducer 27 (typically 100:1 ratio), the output of which drives pressure regulator 20. The latter regulator derives its air supply from 20 p.s.i.g. supply line 28 via line 29, the existing pressure of which is indicated by pressure gage 30. Air pressure limit switches LS–1 and LS–2 connected into the electrical circuit as hereinafter described limit the operation of motor M–1 to define the extremes of regulator 20 output pressure.

The output adjuster section regulative of the controlled variable delivers its pneumatic output signal via line 32 to the apparatus adjusting the controlled variable, indicated schematically at block 9, control imposition therefrom being represented by the broken line connection running from the latter to block 8. This signal is generated by pressure regulator 33 (3–15 p.s.i.g. range), which derives its air supply via line 34 from the same source 28 as the memory-interrogator section. The output signal is indicated on pressure gage 35.

A second reversible motor M–2, identical in all respects with M–1, drives pressure regulator 33 through gear speed reducer 36 (typically 100:1 ratio) via a second speed reducer 37 (typically 10:1 ratio), and the section is provided with air pressure-actuated limit switches LS–3 and LS–4 limiting the extremes of regulator 33 output pressure. The second speed reducer 37 is required for the example process only because of the high process sensitivity inherent therein and, for less sensitive processes, would not be used.

Turning now to the electrical circuit shown in detail in FIG. 3, the several sections thereof are denoted generally as to function by the marginal legends. The power supply for the entire apparatus is drawn from leads 40 and 41, typically 115 v. A.-C. electrical supply lines. The circuit is provided with a main power switch 42 and an electrical fuse 43, following which there are a multiplicity of parallel-connected A.-C. relay contact and coil branches. Thus the output control reversing, or ratchet, relay is RR connected in series with normally open relay R–4a contacts and normally closed time delay relay contacts TR–1a, which contact pairs are both shunted by the synchronizing pushbutton switch PB–1. It will be understood that the conditions of all contacts portrayed in the drawings correspond to the "shelf state," or de-energized static conditions, of the several relays involved. It might be mentioned that ratchet relay RR is of the conventional type incorporating a spring-loaded armature which is pulled in when the relay coil is energized, which armature is provided with a pawl finger indexing a ratchet wheel, together with the shaft keyed thereto, a fraction of a revolution. The shaft is provided with a cam which engages the contact leaves of the relay, i.e., contacts RR, and closes the electrical circuit therethrough. De-energization of the relay causes retraction of the armature and its pawl finger, but does not disturb the cam position, and there is thus required another relay energization to index the ratchet one more step, moving the cam contact actuator correspondingly and thereby opening the contact leaves as the next operation in sequence, to complete the switching cycle. The "down" direction-of-operation output control relay is R–5, connected in series with the normally open reversing relay contacts RR. Indicator lamp 24, which can be a neon bulb provided with series-connected protective resistor 25, affords indication of the power-on status of the apparatus.

Memory control is effected by seal-in relay R–1 in series circuit with holding contacts R–1a and, individually, with the normally open contact pairs R–4b and R–3a, respectively, all of which are effectively shunted by the normally closed time delay relay contacts TR–1b connected in series with time delay relay coil TR–1 in the next-following branch. The memory control relay contacts are collectively shunted by the manual pushbutton switch PB–2. The power supply for the balance of the circuit is furnished through step-down transformer 45 (typically 110 v. to 24 v.), provided with a regulable inductance 46 in series with the primary winding thereof.

The secondary winding of transformer 45 supplies full-wave bridge rectifier 47, which is connected across the main 24 v. supply leads 48 and 49 (grounded) through load resistor 50 (typically 4 ohms, 50 watts) and 3 amp. fuse 51. Pilot lamp 52 and voltmeter 53 give indication of the power status within the circuit, and capacitor 54 (typically 500 microfarads at 100 v.) filters out potentially disturbing ripple components in the power delivered.

Next in order is the up-direction relay R–3 which is in series circuit with contact pair 15a of pressure differential switch 15 (FIG. 2) reserved for reaction to the sensing of the process variable on the increase from the preceding sampling. Relay R–4, in series circuit with contact pair 17a of pressure differential switch 17 (FIG. 2), is similarly reserved for reaction to the sensed process variable on the decrease from the preceding sampling.

The two motor circuits have identical general configurations but are, of course, responsive to different relays and so the circuits contain different relay contact pairs. The motor circuits incorporate a main power supply contact pair R1–b disposed ahead of motors M–1 and M–2 and their associated controls, and interposed before motor M–2 and its controls is output disconnect switch 57. Each armature is provided with potentiometers in the power supply circuits, 58 and 59 for M–1, and 60 and 61 for M–2, which are each in circuit with an individual limit switch, e.g., normally open LS–1 and normally closed LS–2 for M–1 and normally open LS–3 and normally closed LS–4 for M–2. LS–1 and LS–3 are both preset to remain open below about 2 p.s.i.g., whereas LS–2 and LS–4 are both preset to remain closed up to a pressure of about 16 p.s.i.g., which constrains operation of the apparatus within the usual 3–15 p.s.i.g. range which is the practice in the art. Each motor armature is additionally provided with an individual voltmeter 62 indicating "up" or "down" voltage levels. Pilot lamps 63 and 64 in the M–1 motor circuit and 65 and 66 in the M–2 motor circuit are optionally provided as an additional operation check. Finally, there are symmetrically disposed relay contact pairs in each of the motor armature winding circuits, such as normally open R–4c and R–4d in series with LS–1 and normally open R–3b, and R–3c in series with LS–2 for the M–1 motor, and normally open R–5d and R–5b in series with LS–3 and normally closed R–5a and R–5c in series with LS–4 for the M–2 motor.

Operation of the apparatus of this invention is initiated by closing both the main power switch 42 and output disconnect switch 57, the latter being a desirable component if it ever happens that control of the process is to be discontinued while still permitting power application to the memory section of the controller circuitry. Closure of switch 42 immediately energizes motor seal circuit relay R–1 through contacts TR1–b, which are normally closed, closing the main power supply contacts R–1b in the motor circuits M–1 and M–2. In addition, R–1a seal contacts are maintained closed, readying the circuit of which they are part for action predicated on the closure of either contacts R–3a or R–4b, as hereinafter described.

Since operation of the controller is based on a series of individual samplings conducted at regular time intervals, the ratchet mechanism for effecting this sampling is first described. The relay effecting the sampling is a commercially available time delay relay TR–1, which is connected and adjusted to momentarily energize after an elapsed time sufficient to permit the process to conform substantially to the immediately preceding control signal imposition, typically, 95% of the process stabilization time unit, although the conformance can obviously be any other convenient percentage desired, which is constant for all steps of a given process but which must be determined at the outset for each process to the control of which the invention is applied. Typically, the sampling interval is from 30 seconds to 30 minutes duration.

The time delay relay employed in the actual apparatus described was a type employing a spring-anchored piston which was pulled towards the top of an air-tight cylinder when the relay was energized, the cylinder being provided at the closed end with a check valve to permit exhaust of air therefrom, and also with a regulable air bleed valve, the setting of which could be adjusted to permit air ingress to the cylinder at a rate permitting return of the piston to its anchored rest position within a time interval equal to the time delay which it is sought to obtain. Thus, when the relay TR–1 is energized, the piston is pulled upward against the force of its anchoring spring and the contacts TR–1a and TR–1b, which are closed by the piston only when the piston is at its lowermost position, are then open. These contacts remain open all the while that the relay piston is retained inwardly within the cylinder by the pressure of the atmosphere applied to the piston base but, when the piston has finally moved outwardly to its fully extended position following the tolling of the preset time delay period, contacts TR–1a and TR–1b again close. The cycle then immediately repeats as the coil of TR–1 is again energized through its own set of contacts TR–1b.

As will be seen by reference to FIG. 3, energization of time delay relay TR–1 occurs by power supply across line 40 to 41 through normally closed contacts TR–1b when TR–1 has tolled its preset time delay period. This momentarily closes contacts TR–1a, which energizes reversing relay RR if contacts R–4a are at this time closed, as hereinafter described. However, TR–1 thereafter de-energizes itself by opening contacts TR–1b in its own power circuit upon the re-opening of contacts R–3a or R–4b, as the case may be, which commences the running of the next-following time delay period before another sampling occurs, leaving the corrective action dictated by the controller to ensue in the meantime as effected by the settings of the other circuit components now to be described. From this it will be apparent that a long run on the memory section and output adjuster section motors does not shorten the next-succeeding control cycle, which is advantageous, since control should depend exclusively on the process variable sensed through line 12, as it does in the operation described, and not on extraneous considerations.

It will be understood that the M–1 and M–2 fields are energized by direct current at all times through transformer 45 and bridge rectifier 47. Thus, operation depends on reversing the polarity of the power supplied to the M–1 and M–2 armatures which is effected by switching, in an "up" direction, by actuation of the normally open R–3b and R–3c contacts for M–1 and the normally closed R–5a and R–5c contacts for M–2, and in a "down" direction by actuation of the normally open contacts R–4c and R–4d for M–1 and of the normally open contacts R–5d and R–5b for M–2. Closure of the "up" contacts is typically associated with rotation of the motors M–1 and M–2 in the circuit detailed in one given direction, e.g., in the actual apparatus, clockwise, whereas closure of the "down" contacts causes motor rotation in the opposite, or counterclockwise, direction.

Referring to FIGS. 2 and 3 together, when the air pressure in transducer line 12 rises, indicating an increase in the process variable, the pressure balance across the diaphragm is disturbed by pressure rise in the upper section of differential pressure switch 15, the memory pressure in the lower section remaining at the value to which it was adjusted pursuant to the immediately previous sampling. This closes contacts 15a, energizing the "up" direction relay R–3 and closing contacts R–3b and R–3c in the M–1 motor circuit as well as closing contacts R–3a in the relay R–1 circuit. Since the R–1 relay is normally energized through normally closed contacts TR–1b, and thus is sealed in through its own contact pair R–1a, the contact pair R–1b in the motor circuits M–1 and M–2 is at this time closed, energizing both of the motor armatures to produce rotation in the clockwise direction. Accordingly, motor M–1 drives the valve of pressure regulator 20 to a more open position by mechanical connection through speed reducer 27, which increases the air pressure within line 19 and balances the pressure applied to the lower section of pressure switch 15 to open contacts 15a, de-energizing relay R–3 and bringing motor M–1 to a halt. This constitutes the memory function of the apparatus. All during the time M–1 was in rotation, motor M–2 was similarly in rotation, opening the valve of pressure regulator 33 by mechanical connection through speed reducers 36 and 37, thus applying an increased pressure control signal via line 32, which is the controller output regulating the controlled variable in the process by conventional means not detailed, so as to bring about an increase in the process variable. Assuming that control commenced to the left of the optimum and at the lower end of the process equilibrium curve, as depicted in FIG. 1a, the first control step consists of the horizontal "tread" g, which is followed by the process response "rise" indicated at "h." For simplification of the representation, the rise lines are all shown as intersecting the process equilibrium curve, but, since this would require an infinitely long time for accomplishment, the 95% process stabilization time unit is settled on as a practical compromise in this regard.

On the next succeeding sampling, the exact action hereinbefore described repeats, so that another ascending step with further regulation of the controlled variable in the same rightward direction takes place until, ultimately, the controlled variable is brought to a point m either coinciding with, or extremely close to, the optimum. If the process is not thereafter disturbed by extraneous factors, operation will continue at the optimum without further activity by the controller, since no pressure differential exists between the memory and process variable pressures as determined by pressure switches 15 and 17.

It may well develop that control might have to be imposed from the "high" side of the optimum, as depicted in FIG. 1b. In this case, the memory pressure is recurrently higher than the transducer pressure sensed via line 12, which imposes an over-balancing pressure on the upper section of pressure switch 17, closing its contacts 17a, the contacts 15a of switch 15, of course, remaining open. Closure of contacts 17a energizes relay R–4, closing contacts R–4a in series with ratchet relay RR and closing also contacts R–4b in shunt connection with respect to R–3a contacts but in series with motor seal relay R–1 and its seal contacts R–1a. The latter action, upon completion of the itme delay cycle of TR–1 and momentary closure of TR–1b contacts, energizes R–1, which closes the power supply contacts R–1b in the motor circuits and, LS–1 being now closed because the pressure in line 19 is above 2 p.s.i.g., and contact pairs R–4c and R–4d being now closed by energization of relay R–4, motor M–1 operates in a counterclockwise direction. Motor M–1 thus drives the valve member of pressure regulator 20 in a closing direction and the pressure in line 19 falls, reducing the pressure in the upper section of pressure switch 17 from its imediately previous value, i.e., switch 17 now functions in the "memory" circuit of the controller.

When time delay relay TR–1 tolls its first period, contacts TR–1a close momentarily and, the power circuit for ratchet relay RR being already set up for one armature pull-in and return to normal position, contacts RR close, and remain closed, until the next ratchet step of RR. This energizes relay R–5 which thereupon closes contacts R–5d and R–5b in the armature circuit of motor M–2, at the same time opening contacts R–5a and R–5c. Since LS–3 is closed at this time, because the pressure in line 32 is above 2 p.s.i.g., motor M–2 turns in a counterclockwise direction, closing the valve of pressure regulator 33 and reducing the controlling pressure applied through line 32. Accordingly, the controlled variable is decreased, as indicated by "tread" $i$, FIG. 1b, and this is followed by a "rise" $j$ in the sensed process variable. Since the trend of process variable change is now in an ascending sense, differential pressure switch 15 resumes control through its ratchet relay R–3, whereupon ratchet relay RR remains de-energized and there is no further reversal of controlled variable adjustment. The corrective action thus repeats as a succession of steps which ultimately terminates at point $k$, i.e., the optimum, or in the immediate neighborhood thereof.

As a practical matter, it often happens that control is achieved in part from the "low" side of the optimum and in part from the "high" side, a typical instance being that of FIG. 1c. Here, the process overshot the optimum from the left, so that the "step" carried the controlled variable to a point $n$ well past the desired process variable value. The sensed value of process variable then drops to point $o$, whereupon the next sampling detects the fast that an overshoot has occurred and corrects matters in a revrse direction through the agency of the ratchet relay as hereinbefore described for the case of FIG. 1b.

Another condition which can bring a marked temporary departure from the process equilibrium curve is a heavy spurious surge in the process variable, which produces an inordinate rise in the process variable to a point $p$. The next "tread," being a function of the preceding "rise," carries the process temporarily past the desired optimum to a point $q$. Thereafter, orderly stepwise correction from the right occurs exactly as described for the situations of FIGS. 1b and 1c, and the process is quickly brought to the optimum without difficulty. It will be noted that accommodation for the spurious surge occurs rapidly and surely, as a natural function of the apparatus, eliminating the necessity for any additional equipment and, most importantly, preventing straying of the process farther out of control.

Pushbutton switches PB–1 and PB–2 are desirable auxiliaries, the first permitting immediate synchronization of direction of control with process variation without requiring the toll-out of even a single period of time delay relay TR–1 before ascertainment of the fact, and PB–2 constituting a manual process control over ride should this ever become necessary in an emergency. PB–2 additionally serves the important purpose of bringing a process into close proximity to the desired optimum before control is ever turned over to the automatic apparatus. Thus, if PB–2 is depressed (switch 57 being closed), it will be seen that the output section is caused to change the magnitude of the output signal, which either increases or decreases the controlled variable until PB–2 is again released, since one set of the contact pairs 5a, 5c or 5b, 5d is always closed at any given time. If it develops that control effected by PB–2 is in the wrong direction, as evidenced by indication of pressure gage 35, it is merely necessary to momentarily depress PB–1, so that relay RR ratchets one step to reverse the control trend, whereupon control then takes the correct direction.

It will, of course, be understood that, while a maxima has been detailed as the basis for control in the detailed example, control to a minima is just as readily obtained by use of this invention, Moreover, while a sampling interval range of 30 secs. to 30 mins. duration has been hereinbefore mentioned as typical, a practically unlimited longer period can be utilized, e.g., 24 hrs. or even a longer time, for very slow processes, although the latter would require special designs of time delay relays, such as, for example, clock-operated or similar constructions.

Yet another criticality which can be considered an optimum for control in a chemical process is a predetermined slope to the process equilibrium curve, and the controller of this invention can be readily adapted within the skill of the art to control on such a slope as the standard. In this instance reversal of the direction of controlled variable adjustment must be effected at some slope less than the optimum when the process passes above the optimum, and a similar reversal, but in the opposite direction, must be effected when the process passes below the optimum. To accommodate for the interference caused by process noise, both of these reversals can be delayed in occurrence until a predetermined elapsed time of operation of motor M–1 and M–2, which time is a function of slope.

From the foregoing, it will be seen that the controller of this invention can be modified in numerous respects without departure from the essential spirit of the invention, and it is intended to be limited only by the scope of the appended claims.

What is claimed is:

1. An intermittent optimal process controller for a process having a preselected variable as controlled variable comprising in combination pneumatic memory means sampling and retaining as a function of pneumatic pressure a measure of the magnitude of a process variable exhibiting an optimum value, upon which control is to be base at successive regular time intervals permitting a substantial process variable correction as a consequence of the immediately preceding adjustment of said controlled variable, pneumatic means sensing said process variable as a function of pneumatic pressure and opposing it to said measure of said process variable retained in said pneumatic memory means thereby generating a pneumatic pressure signal proportionate in magnitude to, and in accordance with the direction of change of, said process variable over said measure retained in said pneumatic memory means, and means responsive to said pneumatic pressure signal altering said controlled variable in a direction bringing said process variable towards said optimum value upon which said control is to be base and in an amount proportional to the amount said process variable changed since the immediately preceding sampling.

2. An intermittent optimal process controller according to claim 1 wherein said successive regular time intervals constitute approximately 95% of a process stabilization time unit for the process being controlled.

3. An intermittent optimal process controller comprising in combination a pair of reverse-connected pneumatic pressure switches connected on the one hand to a process variable sensing line carrying a pneumatic pressure which is a function of the magnitude of a process variable exhibiting an optimum on the equilibrium curve of said process and on the other hand to a pressure regulator the setting of which is established by a motor responsive to said reverse-connected pressure switches, as regards both magnitude and direction of departure of said process variable from the value of said process variable existing at the immediately preceding sampling, means sampling said process variable at successive regular time intervals permitting substantial process variable correction to said process equilibrium curve as a consequence of the immediately proceeding adjustment of said controlled variable, and means responsive to said motor altering said controlled variable in a direction bringing said process variable toward said optimum upon which said control is to be based and in an amount proportional to the amount said process variable changed since the immediately preceding sampling.

4. An intermittent optimal process controller according to claim 3 wherein said means responsive to said motor constitutes a second motor connected in driving relationship with respect to a second pressure regulator developing an output pressure signal altering said controlled variable in a direction bringing said process variable towards the optimum upon which said control is to be based and in an amount proportional to the amount said process variable changed since the immediately preceding sampling.

References Cited by the Examiner
UNITED STATES PATENTS

| | | | |
|---|---|---|---|
| 2,059,142 | 10/36 | Prudie | 137—101.19 |
| 2,165,182 | 7/39 | Luhrs | 235—151 |
| 2,322,374 | 6/43 | Lowe | 137—101.19 |
| 2,476,104 | 7/49 | Mason | 137—14 |
| 3,031,267 | 4/62 | Martin | 23—253 XR |
| 3,034,569 | 5/62 | Eastman | 60—39.28 X |

M. CARY NELSON, *Primary Examiner.*

ISADOR WEIL, *Examiner.*